US012162700B2

(12) United States Patent
Madera et al.

(10) Patent No.: US 12,162,700 B2
(45) Date of Patent: Dec. 10, 2024

(54) CONVEYOR FOR THE TRANSPORT OF ASSEMBLED OR SEMI-ASSEMBLED CARTRIDGES FOR ELECTRONIC CIGARETTES

(71) Applicant: G.D S.p.A., Bologna (IT)

(72) Inventors: Giovanni Madera, Bologna (IT); Fabio Roversi, Bologna (IT); Luca Lanzarini, Bologna (IT)

(73) Assignee: G.D S.p.A., Bologna (IT)

( * ) Notice: Subject to any disclaimer, the term of this patent is extended or adjusted under 35 U.S.C. 154(b) by 51 days.

(21) Appl. No.: 17/987,992

(22) Filed: Nov. 16, 2022

(65) Prior Publication Data
US 2023/0150779 A1    May 18, 2023

(30) Foreign Application Priority Data
Nov. 17, 2021  (IT) .......................... 102021000029057

(51) Int. Cl.
| | | |
|---|---|---|
| B65G 54/02 | (2006.01) | |
| A24F 40/70 | (2020.01) | |
| B65G 17/32 | (2006.01) | |

(52) U.S. Cl.
CPC ............. B65G 54/02 (2013.01); A24F 40/70 (2020.01); B65G 17/323 (2013.01)

(58) Field of Classification Search
CPC .... B65G 54/02; B65G 47/901; B65G 17/323; B65G 47/847; B65G 17/32; B65G 47/44; B65G 47/90; A24F 40/70; B65B 43/46
(Continued)

(56) References Cited

U.S. PATENT DOCUMENTS

| | | | |
|---|---|---|---|
| 5,607,045 A | * | 3/1997 | Hermann Kronseder ................... B08B 9/426 198/479.1 |
| 5,893,700 A | * | 4/1999 | Kronseder .............. B08B 9/426 414/744.2 |

(Continued)

FOREIGN PATENT DOCUMENTS

| | | | | |
|---|---|---|---|---|
| CN | 1177729 C | * | 12/2004 | ............. B65B 61/26 |
| CN | 110386389 A | * | 10/2019 | |

(Continued)

OTHER PUBLICATIONS

Search Report dated Jun. 21, 2022. 7 pages.

*Primary Examiner* — Gene O Crawford
*Assistant Examiner* — Muhammad Awais
(74) *Attorney, Agent, or Firm* — RMCK Law Group PLC

(57) ABSTRACT

A conveyor for transporting assembled or semi-assembled cartridges for electronic cigarettes includes a rail extending along a path and a carriage movable on the rail and including a unit for housing cartridge that includes: a seat on which a single cartridge is received; first and second levers positioned on opposite sides of the seat, and being reciprocally rotatable between an open position, to allow the arrangement and/or picking-up of a cartridge, and a closed position, to retain the cartridge in its receiving position on the seat; a follower member for bringing the first lever into rotation as a result of a pushing action executed on the follower member. The housing unit includes a gear mechanism for rotationally connecting the first and second levers, so that the rotation of the first lever induced by the follower member causes, via the gear mechanism, a corresponding rotation of the second lever.

9 Claims, 5 Drawing Sheets

(58) Field of Classification Search
USPC .............. 198/619, 803.9, 803.7, 803.5, 838
See application file for complete search history.

(56) References Cited

U.S. PATENT DOCUMENTS

| | | | | |
|---|---|---|---|---|
| 6,079,541 | A * | 6/2000 | Bercelli | B08B 9/426 198/470.1 |
| 6,435,336 | B1 * | 8/2002 | Knodler | B21D 43/10 198/470.1 |
| 7,331,156 | B2 * | 2/2008 | Hartness | B65G 47/61 53/301 |
| 7,661,739 | B2 * | 2/2010 | Burgmeier | B67C 3/242 294/116 |
| 8,206,144 | B2 * | 6/2012 | Ng | B29C 49/4205 425/534 |
| 8,720,670 | B2 * | 5/2014 | Schulnig | B65G 47/847 198/470.1 |
| 8,894,114 | B2 * | 11/2014 | Fahldieck | B67C 3/242 294/90 |
| 9,463,591 | B2 * | 10/2016 | Winzinger | B65G 29/00 |
| 2003/0029700 | A1 * | 2/2003 | Miller | B65G 17/323 198/803.7 |
| 2019/0246697 | A1 * | 8/2019 | Madera | A24F 40/70 |
| 2019/0329985 | A1 * | 10/2019 | Nishino | B65G 17/323 |
| 2021/0122576 | A1 * | 4/2021 | Jones | B65G 35/06 |
| 2021/0253374 | A1 * | 8/2021 | Elsperger | H02K 41/031 |

FOREIGN PATENT DOCUMENTS

| | | | | |
|---|---|---|---|---|
| DE | 102016221606 A1 | * | 5/2018 | ............ B25J 15/022 |
| EP | 3744649 A1 | * | 12/2020 | ............ B65B 43/12 |
| EP | 3831728 A1 | * | 6/2021 | ........... B65B 17/025 |
| JP | S538966 A | | 1/1978 | |
| JP | S538966 B1 | * | 1/1978 | |
| JP | 2018095322 A | * | 6/2018 | ............ B65B 41/04 |
| JP | 2018184296 A | * | 11/2018 | |
| JP | 2020132167 A | * | 8/2020 | ............ B65G 54/02 |
| WO | WO-03078285 A1 | * | 9/2003 | ........... B65G 47/847 |
| WO | WO-2020078603 A1 | * | 4/2020 | ....... B29C 49/42069 |
| WO | WO-2020250196 A1 | * | 12/2020 | ............. A24F 40/70 |
| WO | WO-2020254464 A1 | * | 12/2020 | ........... B65G 47/847 |
| WO | WO-2021153327 A1 | * | 8/2021 | |
| WO | WO-2021200534 A1 | * | 10/2021 | |

* cited by examiner

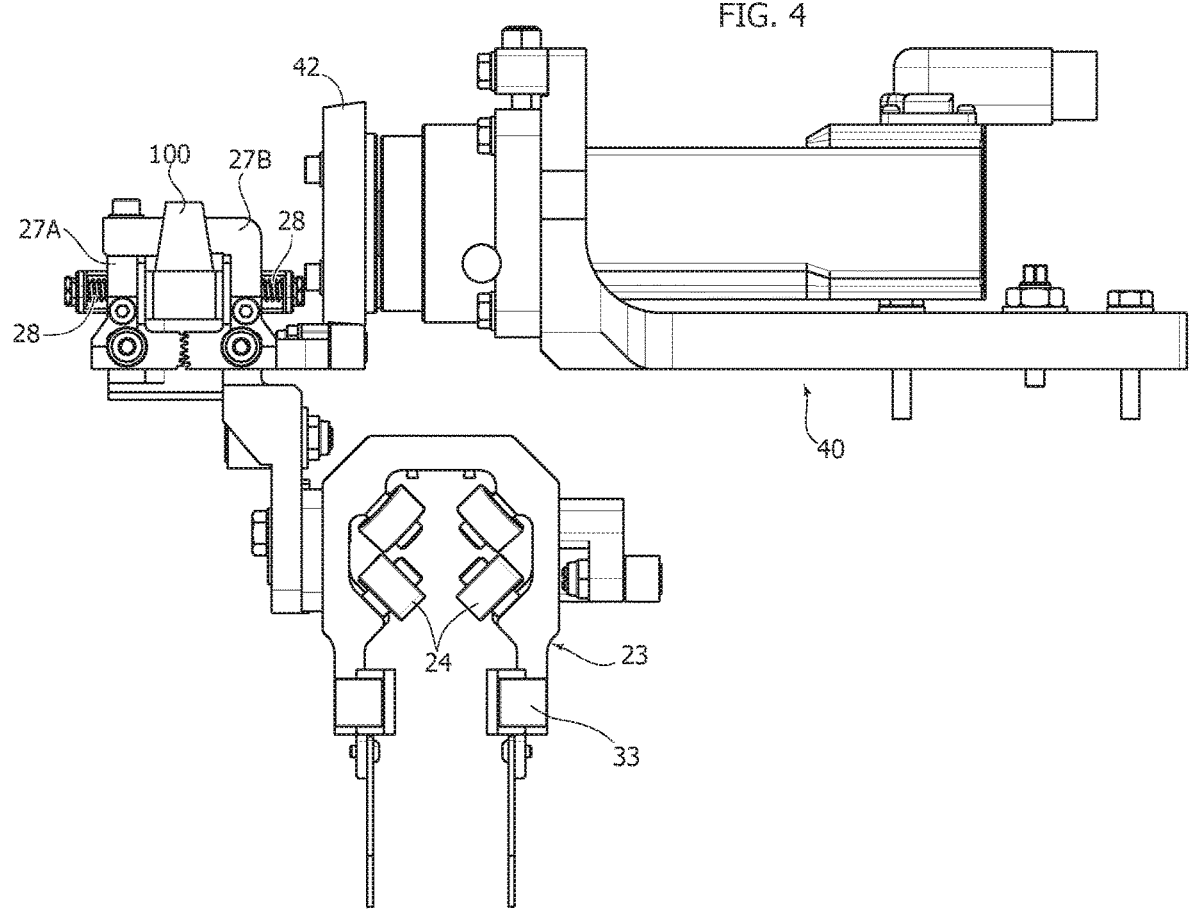

CONVEYOR FOR THE TRANSPORT OF ASSEMBLED OR SEMI-ASSEMBLED CARTRIDGES FOR ELECTRONIC CIGARETTES

CROSS-REFERENCE TO RELATED APPLICATION

This application claims priority to Italian Patent Application No. 102021000029057 filed Nov. 17, 2021. The disclosure of the above application is incorporated herein by reference in its entirety.

FIELD OF THE INVENTION

The present invention relates to a conveyor for transporting assembled or semi-assembled cartridges for electronic cigarettes, in particular for a machine for assembling cartridges.

In particular, the present invention relates to a conveyor of the type comprising at least one rail extending along a path, preferably closed in a ring-like fashion, and at least one carriage movable on the rail, which has a housing unit for the cartridges.

A conveyor of the type indicated above is described, for example, in patent application IT102019000008817 owned by the Applicant.

OBJECT AND SUMMARY OF THE INVENTION

The present invention aims to provide a conveyor of the type indicated above which is improved with respect to the prior art, in particular, which is capable of operating reliably and efficiently even with cartridges that do not have a conventional cylindrical shape or in any case a shape with a constant cross-section.

This object is achieved by means of a conveyor having the features subject of claim 1.

The claims form an integral part of the disclosure provided here.

In a preferred embodiment of the solution described here, the first and second lever comprise respective end portions intended to come into contact with the cartridge received in the seat, and each having a respective contact surface having a shape corresponding to the shape of the relative portion of the cartridge with which the contact surface is intended to be placed in contact, so that, in their closed position, the two levers form a shape coupling with the cartridge.

Furthermore, preferably, the end portion of the first or second lever is adjustable in position to vary its distance with respect to the end portion of the second or first lever, in the reciprocal closed position of the first and second lever.

BRIEF DESCRIPTION OF THE DRAWINGS

Further characteristics and advantages of the invention will become evident from the description that follows, provided purely by way of non-limiting example, with reference to the attached drawings, wherein:

FIG. 4 represents the carriage of FIG. 1 at an actuator device configured to actuate means of the carriage for retaining the cartridges.

DESCRIPTION

In the following description various specific details are illustrated aimed at a thorough understanding of the embodiments. The embodiments may be implemented without one or more of the specific details, or with other methods, components, or materials, etc. In other cases, known structures, materials or operations are not shown or described in detail to avoid obscuring various aspects of the embodiment.

The references used here are only for convenience and do not therefore define the field of protection or the scope of the embodiments.

Figure 1:
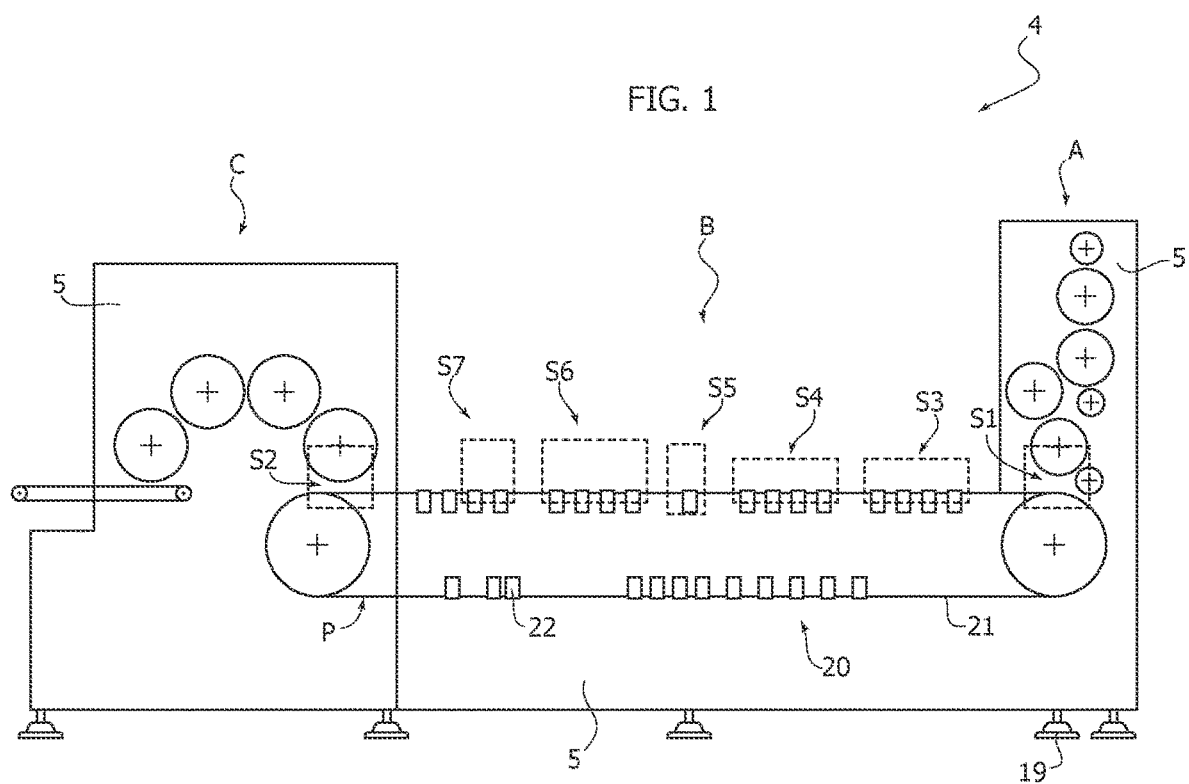
FIG. 1 represents an example of a machine for assembling cartridges for electronic cigarettes in which the conveyor described here can be used.
Figure 2:
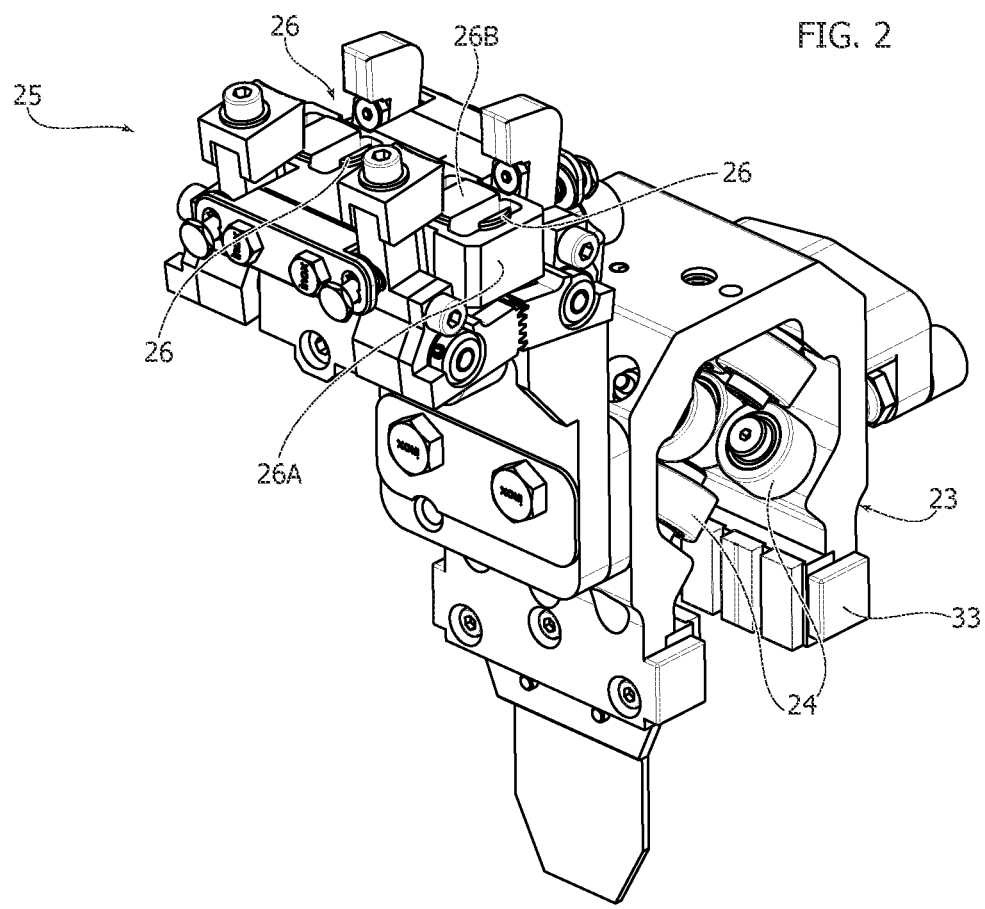
FIG. 2 represents an axonometric view of a carriage used in the conveyor described here.
Figure 3:
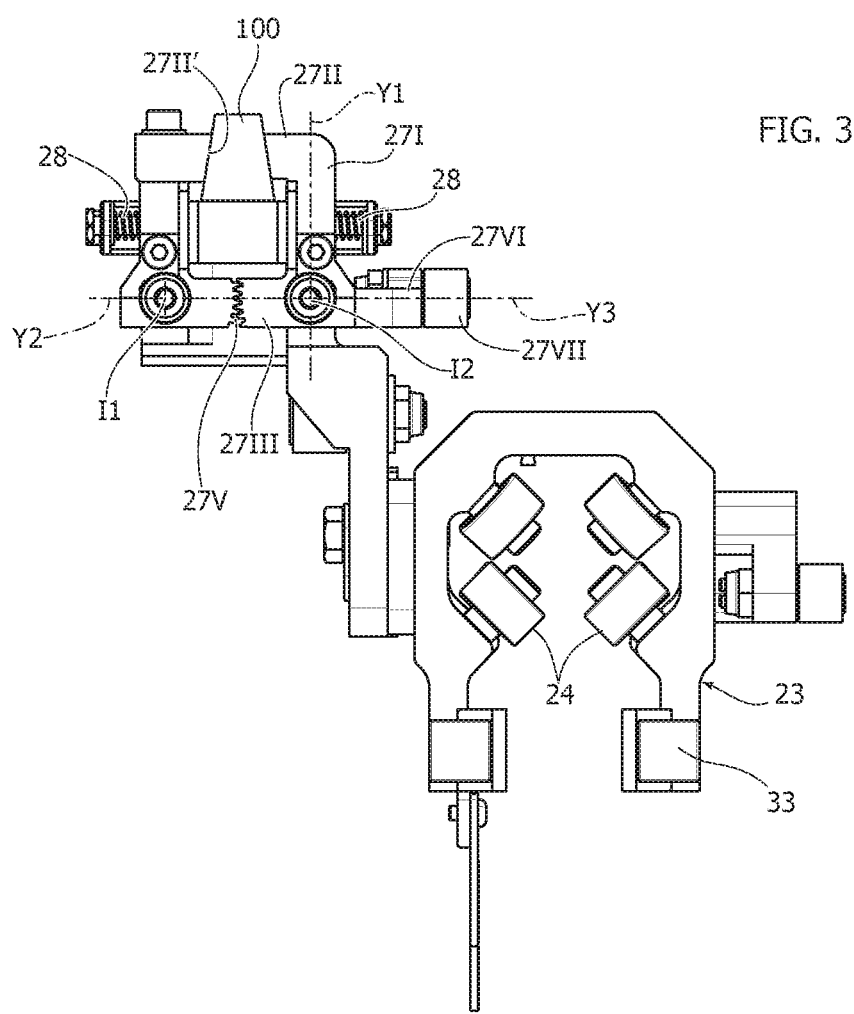
FIG. 3 represents a side view of the carriage of FIG. 2.

In FIG. 1, the reference number 4 indicates as a whole a machine for producing cartridges 100 for electronic cigarettes.

The machine 4 comprises an assembly section in which the materials forming the cartridges 100 are assembled to prepare the cartridges 100, and a feeding section, in which the materials forming the cartridges 100 are received and sorted towards the assembly section.

According to the example shown in FIG. 1, the assembly section of the machine 4 comprises an initial part A, an intermediate part B, and a final part C.

The machine 4 comprises a support frame 5, which rests on the ground by means of a plurality of legs, and presents a vertical wall at the front on which the operating members of the three parts A, B and C are mounted. The intermediate part B of the machine 4 comprises a conveyor 20 to transport the semi-assembled cartridges 100 (i.e. still lacking some element) along a processing path P, which extends between an inlet station S1 and an outlet station S2.

The processing path P comprises a straight operating section extending from the inlet station S1 (which constitutes the end of the initial part A and the beginning of the intermediate part B), in which the semi-assembled cartridges 100 are cyclically delivered to the conveyor 20, to an outlet station S2 (which constitutes the end of the intermediate part B and the beginning of the final part C), in which the cartridges 100 (to which new elements have been added crossing the intermediate part B) leave the conveyor 20. Furthermore, as illustrated in FIG. 1, the path P comprises a straight return section parallel and opposite to the straight operating section and two semicircular connector sections, which connect the operating section and the return section to each other. Still according to the example illustrated in FIG. 1, along the path P (i.e. between the inlet station S1 and the outlet station S2) are arranged in succession (i.e. one after the other) processing stations S3-S6 in which processing operations are performed (for example, adding elements, welding, weighing, optical or electrical checks, bending, etc.) on the cartridges 100 transported by the conveyor 20.

With reference now to FIGS. 2-5B, the conveyor 20 comprises a rail 21 extending along the path P and a plurality of carriages 22 movable on the rail 21.

In one or more preferred embodiments, such as the one illustrated, each carriage 22 comprises a base 23, which has an inverted U-shaped cross-section, so as to receive the rail 21 inside it. On its inner side, the base 23 comprises a plurality of rotatable wheels 24, by means of which the carriage engages the rail 21 and can slide on this by effect of the rolling of the wheels 24 on the rail itself.

Again in a manner known per se, the base 23 carries on itself a movable module 33 of a linear electric motor, which also includes a fixed module associated with the rail 21 and extending along the entire path P.

The carriage 22 also has a unit 25 for housing the cartridges 100.

In one or more preferred embodiments, such as the one illustrated, the housing unit 25 comprises one or more seats 26 on which to receive a cartridge 100, in each seat, and a first and a second lever 27A, 27B positioned on opposite sides of the single seat 26, and mutually rotatable between an open position (FIG. 5A), to allow the arrangement and/or picking-up of a cartridge 100 on/from the seat 26, and a closed position (FIG. 5B), to retain the cartridge 100 in its receiving position on the seat 26.

In the example illustrated, the housing unit 25 comprises two seats 26 side-by-side, to simultaneously receive two cartridges 100, and is provided with a pair of levers 27A, 27B on opposite sides of each seat 26.

In one or more preferred embodiments, such as the one illustrated, the seat 26 is defined by the upper side 26B of a block 26A fixedly mounted on the carriage 22. The block 26A is designed to set in position the cartridge 100 which rests on the upper side 26B of the block. In one or more preferred embodiments, such as the one illustrated, the block 26A may have one or more cavities 26' designed to receive corresponding protrusions of the cartridge 100.

The two levers 27A, 27B are rotatably mounted about respective rotation axes I1, I2 parallel to each other, which preferably lie on a same horizontal plane.

Each lever 27A, 27B comprises a first part 27I, which extends along a first axis Y1, transverse to the rotation axis I1, I2, until it protrudes above the upper side 26B of the block 26A.

The part 27I ends with an end portion 27II arranged to engage one side of the cartridge 100, when the two levers 27A, 27B are in the closed position.

The end portions 27II operate on the cartridge 100 to retain it laterally in a predetermined position, for example, according to an orientation in which the longitudinal axis L of the cartridge 100 is substantially vertical.

In one or more preferred embodiments, such as the one illustrated, the end portions 27II have a contact surface 27II', which has a shape corresponding to that of the region of the side surface of the cartridge 100 with which it is intended to come into contact. In this way, the two levers 27A, 27B in their closed position create, by means of their end portions 27II, a shape coupling with the cartridge 100.

According to an important characteristic of the solution described here, the first and second levers 27A, 27B are connected in rotation by means of a gear mechanism, so as to be able to rotate simultaneously and, preferably, according to a same law of motion.

In one or more preferred embodiments, such as the one illustrated, each lever 27A, 27B comprises a second part 27III extending along a second axis Y2, perpendicular to the rotation axis I1, I2 and transverse to the first axis Y1, in a direction directed towards the other lever 27B, 27A.

The end portions of the parts 27III of the two levers have respective toothed profiles 27V, which are in mutual engagement, forming the aforesaid gear mechanism.

In one or more preferred embodiments, such as the one illustrated, the lever 27B has a third part 27VI, which extends along a third axis Y3, perpendicular to the rotation axis I2 and, preferably, parallel or aligned with the axis Y2 of the second part 27III, in a direction opposite to that of the axis Y2. On the end of the third part 27VI, a sliding contact member 27VII is mounted, for example, a rotatable roller, which is intended to be engaged by a cam 42.

The third part 27VI of the lever 27A, 27B is intended to operate as a follower member in collaboration with the cam 42. In an alternative embodiment, the follower member may be an element separate from the lever 27B, for example being arranged in a position spaced apart from it, and in this case the follower member may be connected to the lever 27B through mechanical-type connection means, for example, by means of an additional lever or a cable.

The cam 42 is part of an external drive device 40, which is arranged in a predetermined position of the path P of the rail 21. In particular, the cam 42, which in the illustrated example is rotatable around a rotation axis X, is arranged to exert a thrust action on the part 27VI of the lever 27B, so as to bring the latter into rotation around the axis I2. Thanks to the gear mechanism defined by the two toothed profiles 27V, the rotation thus induced of the lever 27B causes a simultaneous and corresponding rotation of the other lever 27A.

In this way, the two levers 27A, 27B move to their open position to allow extraction of the cartridge 100 or to receive a new cartridge. Preferably, the cam 42 has a first cam profile configured to drive the rotation of the levers 27A, 27B from the closed position to the open position, and a second cam profile configured to exert a control action on the return movement of the levers 27A, 27B from the open position to the closed position.

An actuation device 40 is provided along the rail 21 in the positions in which it is necessary to actuate the levers 27A, 237B as indicated above, to bring them from the closed position to the open position. For example, a first actuation device 40 may be provided at the inlet station S1 to allow a new cartridge 100 to be arranged in the seat 26 of a carriage 22 that has reached this station. Furthermore, a second actuation device 40 may, on the other hand, be provided at the outlet station S2 to allow the cartridge 100 positioned in the seat 26 of the carriage 22 that has reached this station, to be picked up and transferred to the final part C of the production machine 4.

In one or more preferred embodiments, each lever 27A, 27B is also engaged by an elastic element 28, which is arranged to exert an action on it which tends to keep it in the closed position. In an alternative embodiment, on the other hand, a single elastic element 28 associated with one of the two levers 27A, 27B may be provided, taking into account that these are connected to each other by means of the aforesaid gear mechanism.

In view of the above, it can be noted that the two levers 27A, 27B are capable of making a shape coupling even with cartridges of particular, non-cylindrical shapes, thanks to their simultaneous actuation between the open position and the closed position.

In this regard, in the example illustrated the cartridge 100 has an approximately conical side surface with an interior angle facing downwards. The end portions 27II have contact surfaces 27II', which assume the same conical shape of the region of the cartridge 100 with which they are intended to come into contact.

Figure 5A:
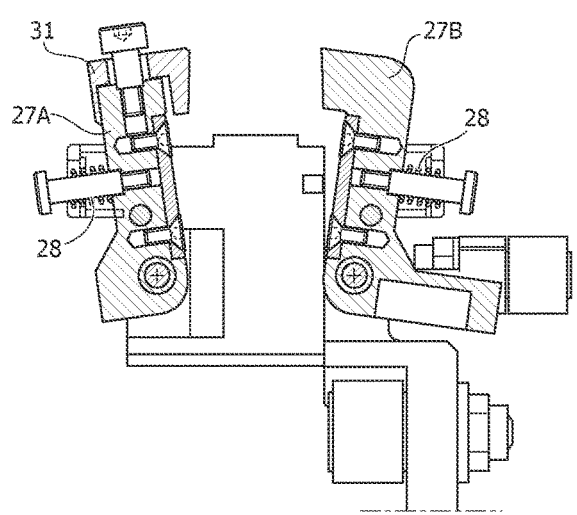
FIGS. 5A and 5B both represent a cross-sectional view of a detail of the carriage of FIG. 2, for two different operating conditions of the retaining means of the carriage.
Figure 5B:
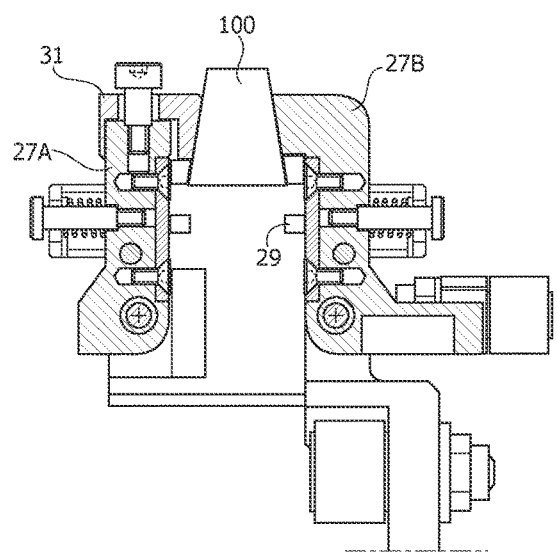

With reference to the open position illustrated in FIG. 5A, the two levers 27A, 27B both assume a rearward position with respect to the seat 26 so as to completely free the passage for the cartridge 100. On the other hand, with reference to the closed position illustrated in FIG. 5B, the two levers 27A, 27B press on the cartridge 100 from opposite sides, keeping it in an equilibrium position corresponding to a predetermined position.

In one or more preferred embodiments, such as the one illustrated, the housing unit 25 comprises an abutment element 29 configured to stop the lever 27B in a predetermined reference position, in the rotation of the lever from the open position to the closed position. Furthermore, the end portion 27II of the lever 27A is defined by an additional body 31 adjustable in position to vary its distance from the end portion 27II of the lever 27B, in the closed position of the two levers. For example, the body 31 is adjustable by means of an eccentric controlled by a screw. By means of the abutment element 29 and the adjustable body 31, the operator can easily search for the equilibrium position of the cartridge 100 corresponding to the predetermined position.

As mentioned in the introductory part of the present discussion, the present invention finds advantageous application with cartridges that do not have a conventional cylindrical shape or—in any case—do not have a shape with a constant cross-section. For example, the cartridge 100 may have a flared shape, that is, an end which is received by the seat 26 that is more extended than the opposite end which is contacted by the first lever and the second lever 27B, 27A.

Of course, without prejudice to the principle of the invention, the details of construction and the embodiments may vary, even significantly, with respect to those illustrated here, purely by way of non-limiting example, without departing from the scope of the invention as defined by the attached claims.

The invention claimed is:

1. A conveyor for transporting assembled or semi-assembled cartridges for electronic cigarettes includes at least one rail extending along a path and at least one carriage movable on the at least one rail, wherein the at least one carriage has a housing unit for housing cartridges, comprising:
    at least one seat on which a single cartridge is to be received;
    a first and a second lever, which are positioned on opposite sides of the at least one seat, and are reciprocally rotatable between an open position, to allow arrangement and/or picking-up of the single cartridge on/from the at least one seat, and a closed position, to retain the single cartridge in its receiving position on the at least one seat;
    a follower member, which is connected to or is part of the first lever and is configured to bring the first lever into rotation, from the open to the closed position, or vice versa, as a result of a pushing action executed on the follower member;
    the housing unit comprising a gear mechanism for rotationally connecting the first and the second levers, so that the rotation of the first lever induced by the follower member determines, via the gear mechanism, a corresponding rotation of the second lever,
    wherein the first and second levers each comprise a first part having an arm portion and an end portion, the arm portion being pivotably coupled at one end for facilitating reciprocal rotatable motion of the respective lever and including the end portion positioned at an opposite end, the end portions intended to be brought into contact with the single cartridge received in the at least one seat,
    wherein the end portion of the first or second lever comprises an adjustable body that is adjustable in position to vary its distance with respect to the end portion and the arm portion of the first or second lever, in the reciprocal closed position of the first and second levers, and
    wherein the adjustable body and one of the end portions have outer engagement surfaces configured to contact the single cartridge, each outer engagement surface sized and shaped to correspond to a size and shape of an outer contact surface of the cartridge so that the outer engagement surfaces are configured to form a shape coupling with the single cartridge when the first and second levers are in their closed position.

2. The conveyor according to claim 1, wherein the first and the second levers comprise respective toothed parts which reciprocally engage and define the gear mechanism.

3. The conveyor according to claim 2, wherein:
    each of the first and the second levers is rotatable about a rotation axis;
    the arm portion of the first part extends along a first longitudinal axis transverse to the rotation axis, and
    the first and second levers each comprise a second, toothed, part which defines the toothed part of the gear mechanism and which extends along a second longitudinal axis transverse to the rotation axis and the first axis, the second part being coupled to the first part.

4. The conveyor according to claim 3, wherein the first lever comprises, a third part, which constitutes the follower member and extends along a third axis transverse to the rotation axis, and parallel to, or coinciding with, the second axis and oriented to an opposite direction.

5. The conveyor according to claim 1, wherein the housing unit comprises at least one elastic element, which engages the first or second lever and is configured to execute on this an action to maintain the first and the second levers in the closed position.

6. The conveyor according to claim 1, wherein the housing unit comprises an abutment element configured to stop the first or second lever at a predetermined reference position, in the rotation of the first and second levers from the open position to the closed position.

7. The conveyor according to claim 1, comprising a linear electric motor including a fixed module associated with the at least one rail, and extending along an entire path of the at least one rail, and a mobile module which is mounted on the at least one carriage.

8. The conveyor according to claim 1, comprising a driving device, which is arranged in a fixed position along the path of the at least one rail and is configured to exert a pushing action on the follower member connected to the first lever, so as to bring the first lever into rotation, from the open to the closed position, or vice versa.

9. The carriage for the conveyor according to claim 1, comprising the unit for housing the cartridges, comprising:
    the at least one seat on which the single cartridge is to be received;
    the first and the second lever which are positioned on opposite sides of the at least one seat, and are reciprocally rotatable between the open position, to allow the arrangement and/or picking-up of the single cartridge on/from the at least one seat, and the closed position, to retain the single cartridge in its receiving position on the at least one seat;
    the follower member which is connected to or is part of the first lever and is configured to bring the first lever into rotation, from the first to the second position, or vice versa, as the result of the pushing action executed on the follower member;

the housing unit comprising the gear mechanism for rotationally connecting the first and second levers, so that the rotation of the first lever induced by the follower member causes, via the gear mechanism, the corresponding rotation of the second lever.

* * * * *